FELL & MATTOCKS.
Hay Loader.
No. 111,735.
Patented Feb. 14, 1871.
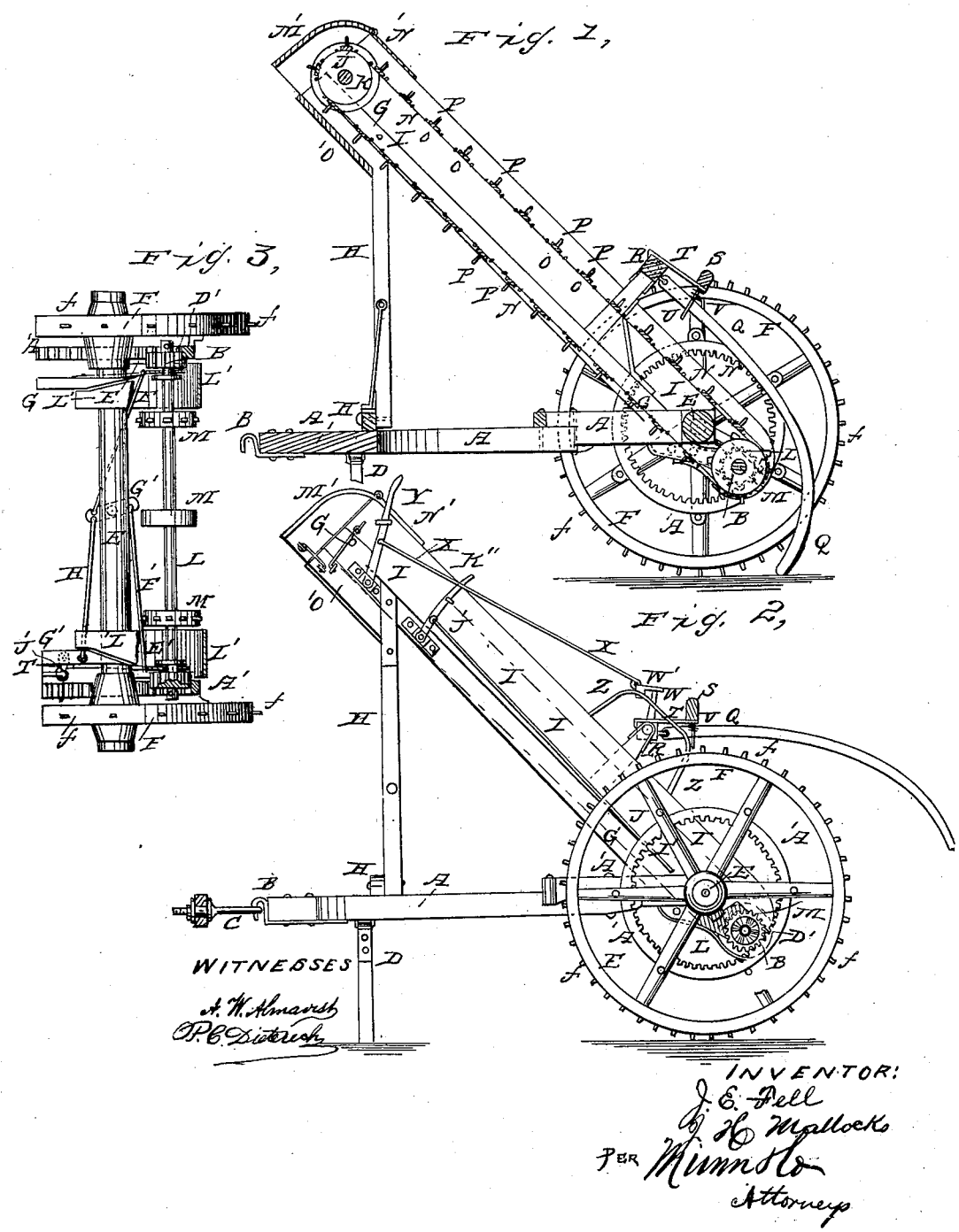
WITNESSES
INVENTOR:
J. E. Fell
J. H. Mattocks
PER Munn & Co.
Attorneys

United States Patent Office.

JOHN E. FELL AND JOHN H. MATTOCKS, OF MAQUOKETA, IOWA.

Letters Patent No. 111,735, dated February 14, 1871.

IMPROVEMENT IN HAY-LOADERS.

The Schedule referred to in these Letters Patent and making part of the same.

*To all whom it may concern:*

Be it known that we, JOHN E. FELL and JOHN H. MATTOCKS, of Maquoketa, in the county of Jackson and State of Iowa, have invented a new and useful Improvement in Hay-Rake and Loader; and we do hereby declare that the following is a full, clear, and exact description thereof, which will enable others skilled in the art to make and use the same, reference being had to the accompanying drawing forming part of this specification.

Figure 1 is a vertical longitudinal section of our improved machine.

Figure 2 is a side view of the same.

Figure 3 is a detail view of the driving apparatus.

Similar letters of reference indicate corresponding parts.

Our invention relates to hay-rakers and loaders, and consists in a certain combination of parts for operating the rake, which will first be described in connection with all that is necessary to a full understanding thereof, and then clearly specified in the claim.

A is the base or foundation-frame of the machine, which may be made somewhat in the form of the rear hounds of a wagon.

To the forward end of the frame A is attached a hook, B, which may be hooked into a staple, C, attached to the rear part of a wagon.

D is a forked leg, the upper end or angle of which is pivoted to the forward part of the frame A, and which is designed to support the forward part of the machine when detached from the wagon.

To the rear end of the frame A is rigidly attached the axle E, upon the journals of which the wheels F revolve.

The rims of the wheels F are corrugated, or have spikes *f* attached to them, to prevent them from slipping upon the ground when the machine is working.

G is the upper or inclined frame, the lower part of which is securely attached to the axle E or frame A, and the upper part of which is supported by the standards or frame H, which is securely attached to the forward part of the frame A.

To the frame G, or to posts or stakes attached to said frame, are attached side boards I to keep the hay upon the carrier while being carried up the frame G.

To the upper end of the frame G is pivoted a shaft, J, having two or more spur-wheels, K, attached to it.

To the lower part of the frame G or to the axle E, or to brackets or arms attached to said frame or axle, is pivoted a shaft, L, having two or more spur-wheels, M, attached to it.

N are two or more endless chains, the links of which fit upon the cogs, teeth, or spurs of the wheels K M, so that the said endless chains may be carried forward and upward by the revolution of the said spur-wheels.

To the chains N are attached cross-bars O, which are provided with teeth P which take hold of the hay as it is collected by the rake-teeth Q, carry it up, and discharge it upon the wagon.

The rake-teeth Q are made curved, as shown in figs. 1 and 2, and their upper ends are pivoted to a bar, R, the ends of which work in bearings attached to the frame G or side boards I, or to both, and which project so that the hay may be conveniently carried up beneath the said bar R.

S is a bar placed parallel with the bar R, and connected with it by the rigid arms T.

To the bar S are attached long staples U, through which the rake-teeth Q pass, and which keep the said teeth in their proper relative positions.

The rake-teeth Q are held down to their work by the coiled springs V interposed between the teeth Q and bar S, and which allow the said teeth to yield when they encounter an obstruction.

To one end of the bar R is attached an arm, W, to the upper end of which is pivoted a short lever, W', to which is attached the rear end of the connecting-rod X, the forward end of which is attached to the lever Y, which is pivoted to the upper part of the frame G, so that by operating the said lever Y, the rake-teeth Q may be raised from the ground when desired. The lever Y may be provided with one or more catches to hold it in position when adjusted.

The arm W, as the rake-teeth are raised and lowered, moves along the curved bar Z attached to the side boards I, and against which, as a fulcrum, the lever W' works; and when the said teeth are in working position the said arm drops into a notch in the said bar Z, to hold the said bar R stationary until operated by the lever Y.

To the inner sides of the spokes of the wheels F are secured the internally-toothed gear-wheels A', into the teeth of which mesh the teeth of the small gear-wheels B', which run upon the end of a shaft, L, and have a clutch, C', formed upon their outer ends, which takes hold of a pin or cross-head, D', attached to the ends of the shaft L, so that the said shaft may be carried with the said wheels in their revolution when the machine is drawn forward.

Upon the inner ends of the hubs of the wheels B' is formed a groove, in which rides the forked ends of the springs E', the other ends of which are attached to the frame-work of the machine, and to which are attached the outer ends of the connecting-rods F', the inner ends of which are attached to the opposite ends of the equal-armed lever G', which is pivoted at its central point to the middle part of the axle E.

To one end of the equal-armed lever G' is attached one end of the connecting-rod H', the other end of which is pivoted to one arm of the bell-crank lever I', which is pivoted to the frame G, works in a recess between said frame G, and the lower edge of the side board I; and to the end of its other or outer arm is attached the rear end of the connecting-rod J', the forward end of which is attached to the lever K', which is pivoted to the upper or forward end of the frame G, so that the carrier may be thrown out of gear by operating the lever K'.

When the lever K' is released the machine is thrown into gear by the action of the springs E'. The lever K' may be provided with one or more catches to hold it in position.

The gear-wheels B' and their attachments are covered and protected from the hay by the cap-plates L' attached to the frame-work of the machine, as shown in figs. 1, 2, and 3.

The upper end of the carrier is covered by a cap, M', to prevent the hay from being blown back or off by the wind while passing over the upper end of the machine.

The cap M' may be stationary, or it may be hinged to a cross-bar, N', attached to the upper ends of the side boards I. In this case the cap may be held in place by hooks and staples. This allows the cap to be turned back, should the upper end of the carrier become clogged.

O' is a board attached to the under side of the upper ends of the frame G to prevent the hay from being dragged from the load by the carrier when moving down the under side of the upper end of the machine. The board O' should be detachably attached to the frame G, so that it may be conveniently removed when desired.

Having thus described the machine containing our invention,

We claim as new and desire to secure by Letters Patent—

The curved bar Z, arm W, lever W', and rod X, combined and relatively arranged as and for the purpose described.

JOHN E. FELL.
JOHN H. MATTOCKS.

Witnesses:
J. J. REED,
L. D. SCHRADER.